US007121264B2

(12) United States Patent
Frank et al.

(10) Patent No.: US 7,121,264 B2
(45) Date of Patent: Oct. 17, 2006

(54) ADJUSTABLE PRESSURE REGULATING VALVE FOR FUEL INJECTION SYSTEMS

(75) Inventors: Kurt Frank, deceased, late of Schorndorf (DE); by Claudia Esther Frank, legal representative, Schorndorf (DE); Werner Wagner, Gerlingen (DE); Christian Braeuer, Steyr (AT)

(73) Assignee: Robert Bosch Gmbh, Stuttgart (DE)

( * ) Notice: Subject to any disclaimer, the term of this patent is extended or adjusted under 35 U.S.C. 154(b) by 0 days.

(21) Appl. No.: 10/508,939

(22) PCT Filed: Jan. 20, 2003

(86) PCT No.: PCT/DE03/00137

§ 371 (c)(1), (2), (4) Date: Jul. 6, 2005

(87) PCT Pub. No.: WO03/083286

PCT Pub. Date: Oct. 9, 2003

(65) Prior Publication Data

US 2006/0042599 A1 Mar. 2, 2006

(30) Foreign Application Priority Data

Mar. 28, 2002 (DE) ................................ 102 14 084

(51) Int. Cl.
*F02M 59/36* (2006.01)
*F16K 31/02* (2006.01)

(52) U.S. Cl. ................................ 123/458; 251/129.16

(58) Field of Classification Search ................ 123/458; 251/129.15, 129.16, 129.18; 239/585.3

See application file for complete search history.

(56) References Cited

U.S. PATENT DOCUMENTS

| | | | | |
|---|---|---|---|---|
| 4,310,123 | A * | 1/1982 | TePastte | 239/585.2 |
| 5,067,688 | A | 11/1991 | Tanimoto et al. | |
| 5,381,999 | A * | 1/1995 | Ricco | 251/129.16 |
| 5,901,941 | A * | 5/1999 | Ricco | 251/129.16 |
| 6,131,829 | A | 10/2000 | Ricco | |
| 6,349,703 | B1 | 2/2002 | Rapp | |
| 6,408,824 | B1 * | 6/2002 | Pacucci et al. | 123/467 |

FOREIGN PATENT DOCUMENTS

| | | |
|---|---|---|
| DE | 199 01 863 A1 | 7/2000 |
| EP | 0 916 843 A1 | 5/1999 |
| EP | 1 092 863 A2 | 4/2001 |

OTHER PUBLICATIONS

Robert Bosch, "Elektrinische Speichereinspritzung Common Rail" Diseleinspritzsystem Common Rail, Ausgabe 98/99, Nov. 1998, pp. 1 to 49, Stuttgart, Germany.

* cited by examiner

*Primary Examiner*—Thomas Moulis
(74) *Attorney, Agent, or Firm*—Ronald E. Greigg

(57) ABSTRACT

A fuel injection system for internal combustion engines including a high-pressure reservoir which is acted upon by fuel at high pressure via a high-pressure feed unit and supplies fuel injectors with fuel. The high-pressure feed unit is assigned a pressure regulating valve which is disposed between a high-pressure side and a low-pressure side and includes a valve element which is triggerable via an electrical final control element. The pressure regulating valve includes a housing component which includes a deformable region by way of which, upon mounting of the pressure regulating valve on a receiving body, a gap L between faces of an electrically triggerable final control element assembly is adjustable.

13 Claims, 2 Drawing Sheets

ADJUSTABLE PRESSURE REGULATING VALVE FOR FUEL INJECTION SYSTEMS

CROSS-REFERENCE TO RELATED APPLICATIONS

This application is a 35 USC 371 application of PCT/DE 03/00137 filed on Jan. 20, 2003.

BACKGROUND OF THE INVENTION

1. Field of the Invention

In self-igniting internal combustion engines, besides unit fuel injectors and pump-line-nozzle systems, reservoir-type injection systems are used for injecting fuel. These injection systems include a high-pressure reservoir, which is supplied with fuel at high pressure via a high-pressure pump. The high-pressure pump represents the interface between the high-pressure and low-pressure parts of the injection system. The high-pressure pump includes a pressure regulating valve, which serves on the one hand to open at excessively high pressure in the high-pressure reservoir, so that fuel flows out of the high-pressure reservoir back to the fuel tank via a collection line, and on the other, at excessively low pressure in the high-pressure reservoir, to seal off the high-pressure side from the low-pressure side.

2. Description of the Prior Art

From the publication entitled“Dieselmotor-Management”, 2nd, Updated and Expanded Edition, Vieweg 1998, Braunschweig and Wiesbaden, ISBN 3-528-03873-X, page 270, FIG. 9, a pressure regulating valve used in a high-pressure pump is known; see page 267, FIG. 7, of the same publication. The pressure regulating valve includes a ball valve, which includes a spherical closing body. Received inside the pressure regulating valve is an armature, which on the one hand is acted upon by a compression spring and on the other has an electromagnet disposed opposite it. The armature of the pressure regulating valve is bathed with fuel for the sake of lubrication and cooling.

If the pressure regulating valve is not triggered, then the high pressure prevailing in the high-pressure reservoir or at the outlet of the high-pressure pump is present at the pressure regulating valve via the high-pressure inlet. Since the currentless electromagnet does not exert any force, the high-pressure force predominates over the spring force of the compression spring, so that the pressure regulating valve opens, and depending on the fuel quantity pumped remains more or less widely open.

Conversely, if the pressure regulating valve is triggered, that is, if current is supplied to the electromagnet, then the pressure in the high-pressure circuit is increased. To that end, a magnetic force is generated, in addition to the force exerted by the compression spring. The pressure regulating valve is closed until a force equilibrium prevails between the high-pressure force on the one hand and both the spring force and the magnet force on the other. The magnetic force of the electromagnet is proportional to the triggering current I of the magnet coils inside the pressure regulating valve. The triggering current I can be varied by means of clocking (pulse width modulation).

According to the aforementioned publication, page 270, FIG. 7, the pressure regulating valve is screwed into the high-pressure pump, for instance. The problem then arises that the requisite exact characteristic curve p=f(I), where I stands for the triggering current of the electromagnet, and where Q*=const., is dependent essentially on the air gap L that is established between the armature plate and the magnet core in which the magnet coils of the electromagnet are received. Upon mounting of the pressure regulating valve in a receiving body, in this case a high-pressure pump, for instance, the air gap L is adjusted. Depending on the air gap L, the characteristic curve of the pressure regulating valve, p=f(I), is established. The required tolerance in the aforementioned characteristic curve p=f(I) of the pressure regulating valve is adjusted at a test point, which is defined by a selected value for the triggering current I of the coils of the electromagnet. At this test point, a pressure tolerance of ±Δp of the pressure regulating valve is ascertained. The lower this tolerance proves to be, the better the attainable quality of regulation is in terms of the triggering behavior of the pressure regulating valve, and the more precisely the pressure regulating valve responds to pressure fluctuations between the high-pressure side and the low-pressure side.

Since the air gap L is dependent on the mounting quality and in the procedure of the prior art can be adjusted only at major effort, the pressure tolerance ±Δp established at the test point depends to a considerable degree on the quality of the mounting of the pressure regulating valve on a high-pressure pump, or on some other part subjected to high pressure.

SUMMARY OF THE INVENTION

The advantage of the embodiment proposed according to the invention is above all that in designing a housing body of the pressure regulating valve with an intentionally weakened region, that is, a component region designed to be softer, an elastic and/or plastic deformation can be brought about intentionally upon mounting of the pressure regulating valve in a high-pressure pump or a high-pressure reservoir. With a housing body of a pressure regulating valve that has a region that is elastically and/or plastically deformable, the air gap L in the magnet system comprising the armature plate and magnet core can be adjusted intentionally or changed intentionally. The adjustment or change in the air gap L can be predetermined via the mounting force, for instance by way of the mounting torque to be exerted. Once the air gap L is adjusted within the magnet system, the pressure tolerances at the test point that result from the component tolerances can be minimized, for a predetermined triggering current I for the magnet coils of the electromagnet.

As a result, economical components that involve relatively great component tolerances can be used, since their component tolerances can be equalized upon mounting of the components with a well-defined mounting force, such as a maximum allowable mounting torque.

By changing the air gap L in the magnet system by means of a deformable region of a pressure regulating valve that can be acted upon by a defined mounting force, a previously high pressure tolerance ±Δp can be reduced by a mounting force to the requisite pressure tolerance ±Δp. Thus a more-stable control characteristic of a fuel injection system with a high-pressure reservoir (common rail) can be attained. On the other hand, the embodiment proposed according to the invention assures simpler mounting of a pressure regulating valve on a high-pressure pump or a high-pressure reservoir, since the mounting of the pressure regulating valve on one of these components is less dependent on individual skill, and thus the production rate in large-scale mass production of injection systems or injection system components can be increased considerably.

BRIEF DESCRIPTION OF THE DRAWINGS

The embodiment according to the invention will be described in further detail below in conjunction with the drawings, in which.

DESCRIPTION OF THE PREFERRED EMBODIMENTS

Figure 1:
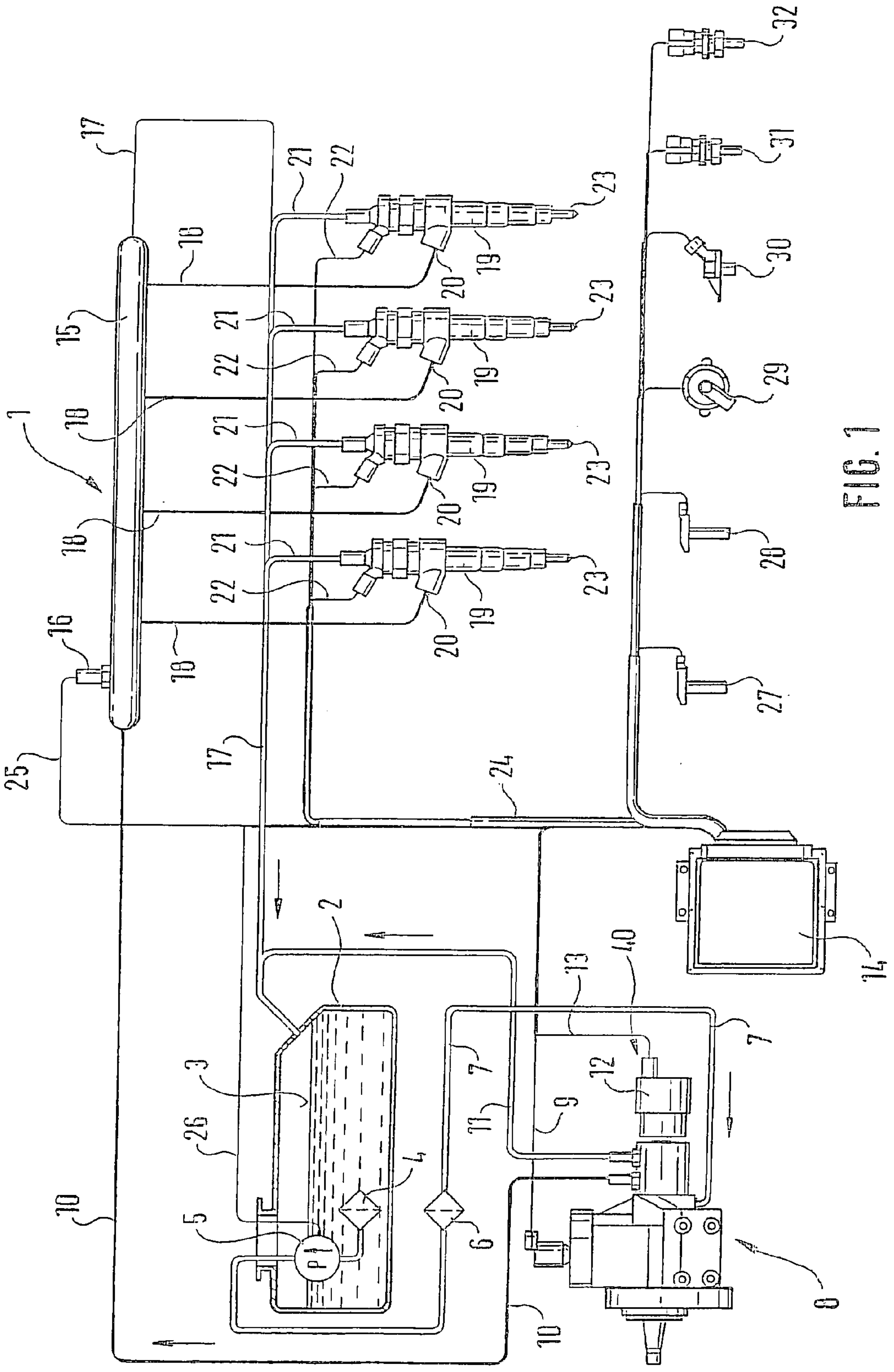
FIG. 1 shows the components of a fuel injection system with a high-pressure reservoir.

The fuel injection system 1 shown in FIG. 1 includes a fuel tank 2, in which fuel is located, as indicated by a fuel level 3. A prefilter 4, preceded by a prefeed unit 5, is disposed below the level of the fuel inside the fuel tank 2. The prefeed unit 5 pumps the fuel, aspirated via the prefilter 4, out of the fuel tank 2 via a fuel filter 6 into a low-pressure line portion 7 that discharges into a high-pressure feed unit 8. The high-pressure feed unit 8, which can for instance be a high-pressure pump, is triggered via a trigger line 9 by a central control unit 14, shown only schematically here. Besides the terminal for the low-pressure line connection 7, the high-pressure feed unit 8 includes a pressure regulating valve 12 with an electrical terminal 40 that is likewise via a triggering line 13, triggered via the central control unit 14. A high-pressure inlet 10 branches off from the high-pressure feed unit 8 and by way of it a tubular high-pressure reservoir 15 is subjected to fuel that is at high pressure. A fuel return line 11 also branches off from the high-pressure feed unit 8 and discharges into a return 17 which in turn carries excess outflowing fuel back into the fuel tank 2.

The fuel, at very high pressure, pumped via the high-pressure inlet 10 by the high-pressure feed unit 8 enters the high-pressure reservoir 15 (common rail), on the outer circumference of which a pressure sensor 16 is received. The pressure sensor 16 is in turn in communication, via a pressure signal line 25, with a central signal transmission line 24, which in turn also extends outward beginning at the control unit 14. From the high-pressure reservoir 15, which may for instance be embodied as a tubular component on the order of a forged part, high-pressure lines 18 branch off, in a number corresponding to the number of fuel injectors 19. The high-pressure lines 18 discharge at the respective inlet connection 20 of the injector bodies of the fuel injectors 19. The fuel injectors 19 include actuators, which may for instance be in the form of piezoelectric actuators, mechanical-hydraulic boosters, or magnet valves and which initiate the injection events in appropriate order. The actuators of the individual fuel injectors 19, via actuator triggering lines 22, likewise communicate with the central signal transmission line 24, which begins at the schematically shown central control unit 14. The individual fuel injectors 19 also have return lines 21, which likewise discharge into the aforementioned return 17 to the fuel tank 2, so that control volumes to be diverted, for instance, can flow out into the fuel tank 2.

Besides the aforementioned triggering line 13 for triggering an electromagnet contained in the pressure regulating valve 12 and a triggering line 9 for the high-pressure feed unit 8 as well as a pressure sensor line 25 to the pressure sensor 16 of the high-pressure reservoir 15, a triggering line 26 with which the prefeed unit 5 accommodated in the fuel tank 2 can be triggered also branches off from the control unit 14. The central control unit 14 of the fuel injection system furthermore receives signals from a crankshaft sensor, which serves to detect the rotary position of the engine, as well as signals from a camshaft sensor 28, by way of which the corresponding phase relationship of the engine can be determined, as well as input signals from an accelerator pedal sensor 29. In addition, the central control unit 14, via the central signal transmission line 24, receives signals that characterize the charge pressure 30, via a corresponding sensor accommodated in the intake tract of the engine. Furthermore, the engine temperature 31, detected for instance at the walls of the combustion chambers of the engine, and the temperature 32 of the coolant fluid are forwarded to the central control unit 14, shown schematically in FIG. 1, via the central control line 24.

Figure 2:
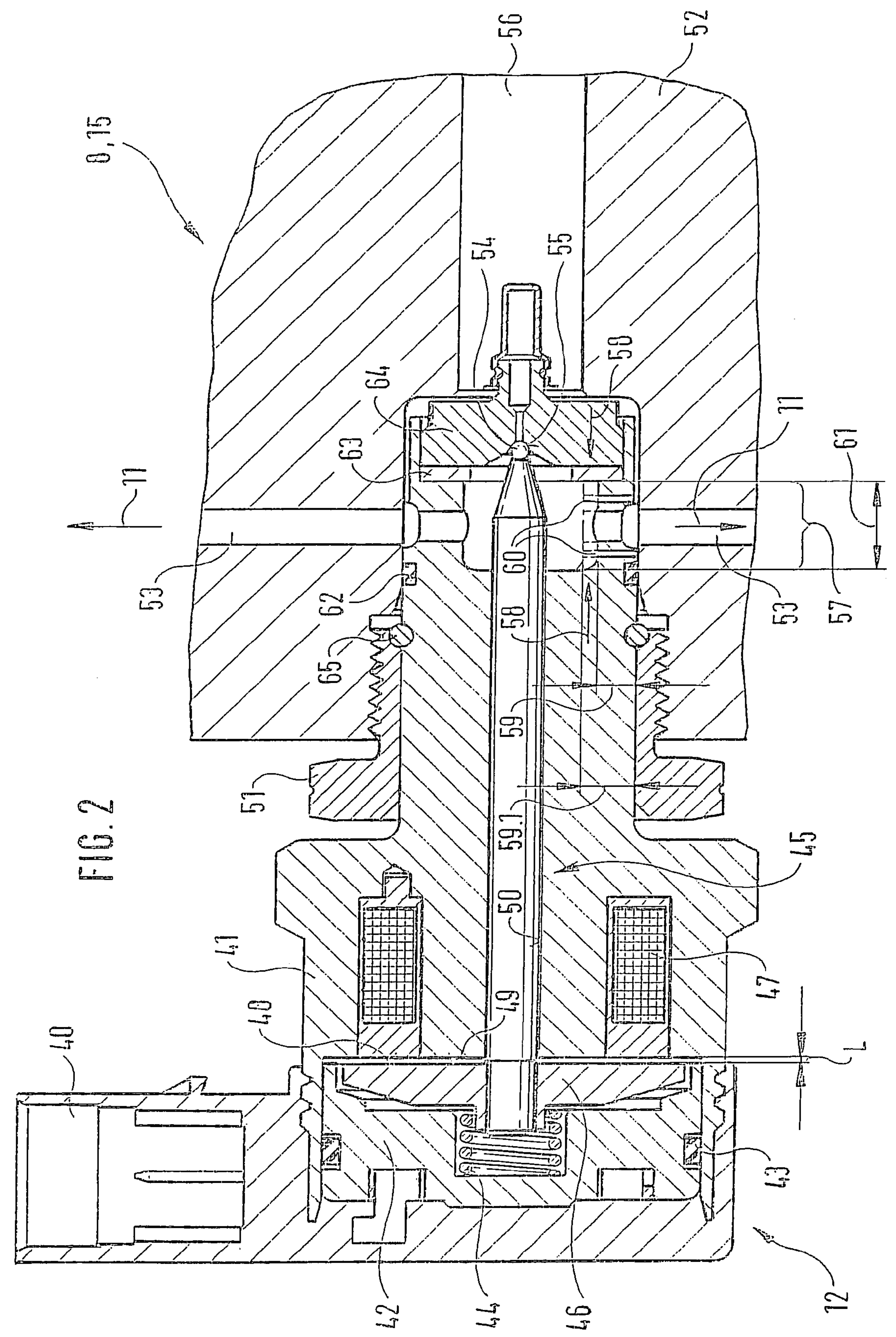
FIG. 2 shows the pressure regulating valve, section on a larger scale, integrated with a high-pressure-carrying component, such as a high-pressure pump or a high-pressure reservoir.

FIG. 2, in longitudinal section on a larger scale, shows the configuration according to the invention of the pressure regulating valve, which is built into a high-pressure-carrying component, whether it is a high-pressure feed unit or a high-pressure reservoir.

It can be seen from the view shown in FIG. 2 that the pressure regulating valve 12 includes an electrical terminal 40, by way of which an electrically triggerable final control element disposed in the pressure regulating valve 12 can be activated and deactivated.

The electrical final control element, in the variant embodiment according to the invention shown in FIG. 2, is embodied as an electromagnetic final control element. An armature bore 50 is provided in a housing component 41 of the pressure regulating valve 12 and is penetrated by an armature part 45. An armature plate 46 is received on one end of the armature part 45. The armature plate 46 is acted upon, on its connection end, by a compression spring element 44. The compression spring element 44 and the outer circumferential surface of the armature plate 46 are surrounded by a bell-shaped insert 42, which is likewise received in the housing component 41 of the pressure regulating valve 12. Opposite one face end 48 of the armature plate 46, an electromagnet 47 is let into the housing component 41 of the pressure regulating valve 12. An air gap L is adjusted between the face end 48 of the armature plate 46 and one face end 49 of the housing component 41.

The housing component 41 of the pressure regulating valve 12 is surrounded by a mounting element 51. In the view shown in FIG. 2, the mounting element 51 is received rotatably on the outer circumferential surface of the housing component 41. In the axial direction, relative to the housing component 41, the mounting element 51 is supported on a support ring 65 that is received in the narrowed-diameter region of the housing component 41. As shown, the mounting element 51 may be embodied as a mounting screw, which includes a male thread that can be screwed into a corresponding thread on a receiving body 8 or 15 in which the pressure regulating valve 12 is secured. The receiving body 8 and 15 may for instance be the high-pressure feed unit 8 shown in FIG. 1 or the high-pressure reservoir (common rail) identified by reference numeral 15. A well-defined tightening torque can be introduced into the mounting element 51, with which torque the housing component 41 of the pressure regulating valve 12 is screwed into the receiving body 8 or 15.

The armature part 45 of the electrical final control element, with its end opposite the armature plate 46, acts upon a closing element 54, here embodied as a valve ball, embodied spherically in the view of the pressure regulating valve shown in FIG. 2. The valve ball 54 is moved by means of the armature part 45 of the electrically triggerable final control element into a seat 55 which is embodied on a seat ring 64. The seat ring 64 is surrounded by the housing component 41, with the interposition of a disklike spacer element 63. The valve element 54, embodied spherically in the view of FIG. 2, closes a through bore, functioning as a throttle, of the seat ring 64. The seat ring 64, whose outer circumferential surface is surrounded by the housing component 41 of the pressure regulating valve 12, is acted upon, on the side opposite the closing element 54, by the system pressure prevailing in a hollow chamber 56. Upon actuation of the armature part 45 of the electrically triggerable final control element of the pressure regulating valve 12, the through bore that can be closed and opened by the valve element 54 acts inside the seat ring 64 as an outlet throttle with regard to the high pressure prevailing in the receiving body 8 or 15. The latter can be relieved, upon actuation of the armature part 45, via the outlet throttle, embodied as a through bore, into the low-pressure part 11, from which low-pressure lines 53 extending perpendicular to the axis of the armature part 45 in the receiving body 8,15 branch off, these lines in turn communicating with the fuel return 11 (see the view in FIG. 1).

The view in FIG. 2 also shows that the housing component 41 of the pressure regulating valve 12, on its end opposite the electrical terminal 40, includes a deformable region 57. The deformable region 57 extends along an axial length 61 between a sealing element 62, received on the circumferential face of the housing component 41, and the disklike element 63, which is likewise surrounded by the housing component 41 of the pressure regulating valve 12. Within this axial length 61, the armature bore 50, which is penetrated by the armature part 45 of the electrical final control element, is surrounded by a hollow chamber. Bores extending perpendicular to the axis of the armature bore 50 are disposed in the hollow chamber wall and are aligned with the low-pressure bores 53 in the receiving body 8, 15. The deformable region 57 extending over the axial length 61 can be designed as intentionally weakened, so that upon mounting of the housing component 41 of the pressure regulating valve 12 in the receiving body 8 or 15, a plastic or elastic deformation of the deformable region 57 ensures. The weakening inside the deformable region 57 can also be dimensioned such that upon mounting of the housing component 41 of the pressure regulating valve 12, an elastic and a plastic deformation of the region 57 ensue. It can be seen from FIG. 2 that the wall of the housing component 41 can be embodied with a reduced wall thickness within the axial length 61. Reference numeral 59 indicates a first wall thickness which is reduced considerably in the region of the mounting element 51, in comparison to the wall thickness between the armature bore 50 and the outer circumferential surface of the housing component 41. In addition, it is entirely possible instead to embody the wall thickness 59.1, in comparison to the aforementioned wall thickness 59, as a wall thickness exceeding the latter, as shown in FIG. 2. The wall thickness 59.1 as shown in FIG. 2 exceeds the wall thickness 59, but assures that upon mounting of the housing component 41 of the pressure regulating valve 12 in the receiving body 8 or 15, an elastic or plastic deformation of the deformable region 57 is assured. Besides a weakening of the wall by reducing the wall thickness to a wall thickness 59 or 59.1 in FIG. 2, through openings 60 may also be disposed within the deformable region. Depending on the number of through openings 60 and their disposition relative to the circumferential surface of the deformable region 57 of an axial length 61 on the outer circumference of the housing component 41, the degree of deformability of the deformable region 57 of the housing component 41 can be varied. The through openings 60 shown in FIG. 2 may also be embodied as through bores; however, it is equally possible to embody the openings 60 as blind bores, so that a deformability of the housing component 41 that varies in the radial direction can be attained upon the mounting of the housing component on the receiving body 8 or 15. It is equally possible to embody the deformable region 57 on the end of the housing component 41 of the pressure regulating valve 12 opposite the connection end with a combined wall weakening, with through openings 60 disposed in this weakened wall zone. In this way, an especially soft deformable region 57 can be attained whose elastic deformability changes over into a plastic deformation when a defined mounting torque is brought to bear.

Besides an embodiment of the deformable region 57 on the housing component 41 of the pressure regulating valve 12 by making a wall weakening 59 or 59.1 and/or disposing through openings 60 along the circumferential surface of the deformable region 57 on the housing component 41, it is also possible to embody the deformable region 57 on it in the form of a Z-shaped profile section, or concertina shape. The adjustment of the air gap L upon mounting of the pressure regulating valve 12 in the receiving body 8, 15 is effected as described below:

The housing component 41 of the pressure regulating valve 12 is first screwed into the female thread in the bore in the receiving body 8 or 15 by means of the mounting element 51 embodied as a mounting screw. After that, a torque can be introduced at the mounting element 51 in a simple way, and with it the housing component 41 is prestressed in the receiving body 8. The axial motion of the housing component 41 is assured by the fact that the mounting element 51, embodied as a mounting screw, is braced on the outer circumferential surface of the housing component 41, on a support ring 65 let into the housing component. This assures that upon tightening of the mounting element 51, the housing component 41 is prestressed against the receiving body 8 or 15. When the housing component 41 is screwed in, the disklike intermediate element 63 presses against an end face of the housing component 41. The seat ring 64, which is provided with a throttle restriction acting as an outlet throttle, presses against the receiving body 8 or 15. On the opposite, connection end of the housing component 41, an air gap L is established between the face end 48 of the armature plate 46, oriented toward the electromagnet 47, and the face end 49 of the housing component 41. Since the air gap L is dependent on the position of the armature plate 46 relative to the face end 49 of the housing component 41, and the tip of the armature part 45 touches the closing element 54, which is received in the seat 55 of the seat ring 64, an air gap L between the face end 48 of the armature plate 46 and the face end 49 of the housing component 41 is established, depending on the mounting torque. In this state, an air gap L prevails that is determined only by the tightening torque of the mounting element 51. Varying the air gap L can be done by having the mounting force 58—represented by the arrows pointing toward one another in FIG. 2—bringing about a deformation, either plastic, elastic and/or plastic and elastic, of the deformable region 57 on the housing component 41 upon further action upon the mounting element 51. As a result of the design of the wall thickness reduction 59 and 59.1 in accordance with the axial length 61 of the deformable region 57, the resultant deformation is dependent on the magnitude of the tightening torque brought to bear on the mounting element 51. Because of the design of the deformable region

57, whether it is with through openings 60, with blind bores along the circumference, a first reduction in the wall thickness (see reference numeral 59), or a second reduction in the wall thickness (see reference numeral 59.1), the degree of deformation of the deformable region 57 on the housing component 41 can be defined. Because of the known tightening torque and the known deformation behavior of the deformable region 57 on the housing component 41, the result is an exactly defined air gap L between the face end 48 of the armature plate 46 and the face end 49 of the housing component 41. Depending on the mounting tightening moment brought to bear at the mounting element 51 and the result deformation of the deformable region 57, the air gap L of the electrical final control element, in this case embodied as an electromagnet, can be varied. Once the air gap L has been adjusted, the electrical terminal 40 is simply clipped onto the circumferential surface of the pressure regulating valve, on the connection end of the housing component 41 of the pressure regulating valve 12.

In the mounted state of the pressure regulating valve 12 on a receiving body 8 or 15, whether this is a high-pressure feed unit 8 or a high-pressure reservoir 15, the air gap L between the face end 48 of the armature plate 46 and the face end 49 of the housing component 41 is adjusted by the mounting force 58 and the deformability of the deformable region 57. Thus with the imposition of a triggering current I, the pressure tolerance ±Δp of the pressure regulating valve 12 can be adjusted in a simple way at a defined test point, which is defined by a defined triggering current I of the electromagnet 47. If the requisite tolerance at the test point is not attained, then by varying the tightening force of the mounting element 51 and a resultant change in the deformation of the deformable region 57 of the housing component 41, the air gap L can be varied at the magnet component. Changing the air gap L is thus a direct consequence of the mounting force 58 exerted upon mounting by the mounting element 51, which in turn determines the deformability of the deformable region 57 on the end of the housing component 41 opposite its connection end. With the embodiment proposed according to the invention of the housing component 41, including a deformable region 57, economical components with relatively great tolerances can be used. The great tolerances, when the mounting force 58 is exerted—for instance in the present case in the form of a mounting torque to which the mounting element 51 is subjected—are brought virtually to zero by the resultant mounting force 58. The air gap L between the armature plate 46 and the face end of the housing component 41 of the pressure regulating valve 12 is established only upon a further increase in the mounting force 58, accordingly after the time at which the component tolerances have already been equalized. Because of a further, well-defined increase in the mounting force 58, the deformation within the deformable region 57 of the housing component 41 that varies the air gap L is established.

On the end of the armature part 45 opposite the seat ring 64, inside the housing component 41, a hollow chamber is embodied. Low-pressure bores 53 branch off from this hollow chamber perpendicular to the armature bore 50 that is penetrated by the armature part 45. When the closing element 54 is opened as a result of triggering of the armature part 45, the closing element 54, here embodied spherically, uncovers the throttle restriction embodied in the seat ring 64 and acting as an outlet throttle, so that fuel at high pressure from the hollow chamber 56, acted upon by system pressure, of the receiving body 8 or 15, into which the pressure regulating valve 12 is screwed with its housing component 41, can flow out from the high-pressure area into the low-pressure area 11 or 53.

The foregoing relates to preferred exemplary embodiments of the invention, it being understood that other variants and embodiments thereof are possible within the spirit and scope of the invention, the latter being defined by the appended claims.

The invention claimed is:

1. In a fuel injection system for internal combustion engines, having a high-pressure reservoir (15), which is subjected to fuel at high pressure via a high-pressure feed unit (8) and supplies fuel injectors (19) with fuel, and the high-pressure feed unit (8) is assigned a pressure regulating valve (12) which is disposed between a high-pressure side (10, 56) and a low-pressure side (11, 53) and includes a valve element (54), which is triggerable via an electrical final control element (47), the improvement wherein the pressure regulating valve (12) comprises a housing component (41), which includes a deformable region (57) by way of which upon mounting of the pressure regulating valve (12) on a receiving body (52) that carries high pressure, a gap L between faces (48, 49) of an electrically triggerable final control element assembly (45, 47) is adjustable, wherein the housing component (41) of the pressure regulating valve (12) that includes the deformable region (57) is embodied as a housing body.

2. The fuel injection system of claim 1, wherein the deformable region (57) on the housing component (41) is located in a region which in the mounted state of the pressure regulating valve (12) on a receiving body (52) is surrounded by the receiving body.

3. The fuel injection system of claim 1, wherein the housing component (41) comprises a mounting element (51) that is movable relative to the outside of the housing component.

4. In a fuel injection system for internal combustion engines, having a high-pressure reservoir (15), which is subjected to fuel at high pressure via a high-pressure feed unit (8) and supplies fuel injector (19) with fuel, and the high pressure feed unit (8) is assigned a pressure regulating valve (12) which is disposed between a high-pressure side (10, 56) and a low-pressure side (11, 53) and includes a valve element (54), which is triggerable via an electrical final control element (47), the improvement wherein the pressure regulating valve (12) comprises a housing component (41), which includes a deformable region (57) by way of which upon mounting of the pressure regulating valve (12) on a receiving body (52) that carries high pressure, a gap L between faces (48, 49) of an electrically triggerable final control element assembly (45, 47) is adjustable, wherein the deformable region (57) on the housing component (41) of the pressure regulating valve (12) is formed by a wall thickness reduction (59, 59.1).

5. In a fuel injection system for internal combustion engines, having a high-pressure reservoir (15), which is subjected to fuel at high pressure via a high-pressure feed unit (8) and supplies fuel injectors (19) with fuel, and the high-pressure feed unit (8) is assigned a pressure regulating valve (12) which is disposed between a high-pressure side (10, 56) and a low-pressure side (11, 53) and includes a valve element (54), which is triggerable via an electrical final control element (47), the improvement wherein the pressure regulating valve (12) comprises a housing component (41), which includes a deformable region (57) by way of which upon mounting of the pressure regulating valve (12) on a receiving body (52) that carries high pressure, a gap L between faces (48, 49) of an electrically triggerable final control element assembly (45, 47) is adjustable, wherein the deformable region (57) on the housing component (41) of the pressure regulating valve (12) is formed by recesses (60) oriented perpendicular to the action line (58) of the mounting force.

6. The fuel injection system of claim 5, wherein the recesses (60) are embodied as through bores.

7. The fuel injection system of claim 5, wherein the recesses (60) are embodied as blind bores.

8. The fuel injection system of claim 3, wherein the mounting element (51) is secured in the axial direction on the outside of the housing component (41) of the pressure regulating valve (12) by a support ring (65).

9. The fuel injection system of claim 1, further comprising an armature plate (46) acted upon by a spring element (44), the armature plate (46) being disposed on the housing component (41) of the pressure regulating valve (12) so that an air gap L is formed between a face end (48) of the armature plate and a face end (49) of the housing component (41) that surrounds an electromagnet (47).

10. The fuel injection system of claim 1, further comprising a seat ring (64) that has a valve seat (55) for the valve element (54), the housing component (41) of the pressure regulating valve (12), on the end toward the valve, surrounding the ring seat.

11. The fuel injection system of claim 10, wherein the seat ring (64) comprises a throttle restriction, which serves on the high side as an outlet throttle with respect to the system pressure inside a hollow chamber (46) of the receiving body (52) and which can be opened and closed by the valve element (54).

12. The fuel injection system of claim 10, wherein the deformable region (57) of the housing component (41) extends in the axial direction (61) between a sealing element (62) and the seat ring (64).

13. The fuel injection system of claim 1, wherein the deformable region (57) of the housing component (41) of the pressure regulating valve (12) is elastic and/or plastic, depending on the mounting force (58) brought to bear at the mounting element (51).

* * * * *